United States Patent
Mazuz

(10) Patent No.: US 11,305,488 B2
(45) Date of Patent: Apr. 19, 2022

(54) PROCESS FOR PRODUCING THREE DIMENSIONAL STRUCTURES

(71) Applicant: CREATIVE IC3D LTD., Beer Sheva (IL)

(72) Inventor: Yacov Mazuz, Rishon Lezion (IL)

(73) Assignee: CREATIVE IC3D LTD., Beer Sheva (IL)

(*) Notice: Subject to any disclaimer, the term of this patent is extended or adjusted under 35 U.S.C. 154(b) by 354 days.

(21) Appl. No.: 16/498,956

(22) PCT Filed: Apr. 2, 2018

(86) PCT No.: PCT/IL2018/050389
§ 371 (c)(1),
(2) Date: Sep. 27, 2019

(87) PCT Pub. No.: WO2018/185759
PCT Pub. Date: Oct. 11, 2018

(65) Prior Publication Data
US 2021/0086442 A1    Mar. 25, 2021

Related U.S. Application Data

(60) Provisional application No. 62/480,558, filed on Apr. 3, 2017.

(51) Int. Cl.
*B29C 64/194* (2017.01)
*B33Y 10/00* (2015.01)
(Continued)

(52) U.S. Cl.
CPC .......... *B29C 64/194* (2017.08); *B29C 64/112* (2017.08); *B29C 64/245* (2017.08);
(Continued)

(58) Field of Classification Search
CPC ... B29C 64/194; B29C 64/112; B29C 64/245; B29C 64/336; B29C 64/10; B33Y 30/00; B33Y 40/20; B33Y 70/882; B33Y 10/00
See application file for complete search history.

(56) References Cited

U.S. PATENT DOCUMENTS 5,976,339 A     11/1999   Andre
2006/0011486 A1  1/2006   Lockard et al.
(Continued)

FOREIGN PATENT DOCUMENTS

CN    203632962 U    6/2014
WO   2008/102266 A2   8/2008
(Continued)

OTHER PUBLICATIONS

International Search Report for PCT/IL2018/050389, dated Jul. 12, 2018, 4 pages.
(Continued)

*Primary Examiner* — Nahida Sultana
(74) *Attorney, Agent, or Firm* — Roach, Brown, McCarthy & Gruber, P.C.; Kevin D. McCarthy

(57) ABSTRACT

A method for producing a 3D structure, according g to which a composite conductive substrate (CCS) with a conductive layer and a non-conductive layer is provided and a conductive pattern is determined for each layer of the 3D structure. A first layer of non-conductive matter on the CCS is printed, such that the conductive pattern of the first layer left empty from the non-conductive matter. The empty conductive pattern is filled with conductive matter by electroplating and for each following layer, in turn, printing, on the previous layer, a layer of non-conductive matter, the conductive pattern of the present layer left empty from the non-conductive matter; plating non-conductive areas of the previous layer that are left uncoated with conductive matter; and (Continued)

filling the empty conductive pattern of the present layer with conductive matter by electroplating.

20 Claims, 2 Drawing Sheets

(51) Int. Cl.
| | |
|---|---|
| *B33Y 30/00* | (2015.01) |
| *B29C 64/112* | (2017.01) |
| *B29C 64/245* | (2017.01) |
| *B29C 64/336* | (2017.01) |
| *B33Y 70/00* | (2020.01) |
| *B33Y 80/00* | (2015.01) |
| *B33Y 40/20* | (2020.01) |
| *B29C 70/88* | (2006.01) |
| *C25D 3/38* | (2006.01) |
| *C25D 5/56* | (2006.01) |
| *B29K 33/04* | (2006.01) |
| *B29K 105/00* | (2006.01) |

(52) U.S. Cl.
CPC .......... *B29C 64/336* (2017.08); *B29C 70/882* (2013.01); *B33Y 10/00* (2014.12); *B33Y 30/00* (2014.12); *B33Y 40/20* (2020.01); *C25D 3/38* (2013.01); *C25D 5/56* (2013.01); *B29K 2033/04* (2013.01); *B29K 2105/0044* (2013.01); *B29K 2995/0005* (2013.01); *B33Y 70/00* (2014.12); *B33Y 80/00* (2014.12)

(56) References Cited

U.S. PATENT DOCUMENTS

| | | |
|---|---|---|
| 2014/0231266 A1 | 8/2014 | Sherrer et al. |
| 2015/0084207 A1 | 3/2015 | Chauhan et al. |
| 2019/0242024 A1* | 8/2019 | Lazarus ................ B29C 64/295 |
| 2021/0178686 A1* | 6/2021 | Erickson ................ B29C 64/30 |

FOREIGN PATENT DOCUMENTS

| | | |
|---|---|---|
| WO | 2014/152911 A1 | 9/2014 |
| WO | 2016/077844 A1 | 5/2016 |

OTHER PUBLICATIONS

Written Opinion of the International Searching Authority for PCT/IL2018/050389, dated Jul. 12, 2018, 4 pages.

Communication and Supplementary European Search Report for EP 18 78 1190, dated Dec. 22, 2020; 12 pages.

* cited by examiner

PROCESS FOR PRODUCING THREE DIMENSIONAL STRUCTURES

FIELD OF THE INVENTION

The present invention relates to a process for producing three dimensional (3D) structures. More particularly, the invention relates to a process for producing 3D structures made from a conductive material embedded in a non-conductive structure.

BACKGROUND OF THE INVENTION

Three Dimensional (3D) printing is part of the digital printing world, which refers to the physical construction of an object from a digital description through selective deposition of material. 3D printing technologies has rapidly advanced in recent years, for example the establishment of multi-material printing. Nonetheless, 3D printers are still limited to materials providing only mechanical characteristics (e.g., rigidity, color, heat resistance and transparency) but not conductivity.

Currently 3D printer manufacturers offer printing of conductive patterns that are formed by nanoparticles and precursors inks. The most common conductive inks are silver inks, which are mainly used to fabricate simple two dimensional (2D) conductive patterns. Unfortunately, this solution produces conductive traces with poor conductivity characteristics that are far from the conductivity characteristics of the pads and other conductive elements of the 3D printed circuits, i.e. of another order of magnitude.

Furthermore, in some 3D structures that combine both conductive and non-conductive areas in a plurality of layers (e.g. a PCB), conductivity between the layers is achieved by drilling via holes through the layers. This process is a brutal procedure, and in many cases not accurate enough for providing the conductivity required. Furthermore, in order to enable conductivity in via holes their walls are activated in order to allow conductive matter to adhere thereto. This procedure is complicated. It would be desirable to achieve conductivity between layers of a 3D structure without using via holes.

It is therefore an object of the present invention to provide a method and system for producing 3D structures made from a conductive material in a non-conductive structure.

It is another object of the present invention to provide a method and system for producing 3D structures made from a conductive material with conductive characteristics that are preserved in a single order of magnitude throughout the whole structure.

It is yet another object of the present invention to provide a method and system for producing 3D structures that combine both conductive and non-conductive areas in a plurality of layers in which conductivity between layers is achieved without using via holes.

Other objects and advantages of the invention will become apparent as the description proceeds.

SUMMARY OF THE INVENTION

A method for producing a three dimensional (3D) structure with conductive material embedded in a non-conductive structure, comprising producing a second layer with a non-conductive portion and an electroplated conductive portion upon a previously produced first layer with a non-conductive portion and an electroplated conductive portion, wherein electroplated conductive portions of the first and second layers are in co-conduction.

More specifically, the method, may comprise the following steps:
 a. providing a composite conductive substrate (CCS) with a conductive layer and a non-conductive layer;
 b. determining a conductive pattern for each layer of the 3D structure;
 c. printing a first layer of non-conductive matter on the CCS, such that the conductive pattern of the first layer left empty from the non-conductive matter;
 d. filling the empty conductive pattern with conductive matter by electroplating; and
 e. for each following layer, in turn:
   i. printing, on the previous layer, a layer of non-conductive matter, the conductive pattern of the present layer left empty from the non-conductive matter;
   ii. plating non-conductive areas of the previous layer that are left uncoated with conductive matter; and
   iii. filling the empty conductive pattern of the present layer with conductive matter by electroplating.

The non-conductive matter may be formed using UV inkjet ink.

The non-conductive areas of a previous layer that are left uncoated are coated with a conductive layer, which is printed using conductive ink.

A copper layer may be built above the conductive ink printed areas, prior to filling the empty conductive pattern of the present layer with conductive matter by electroplating.

The conductive ink may comprise conductive polymers based on one of the following materials, or on a combination thereof: polypyrrole, polyaniline, polythiophene, polyacetylene, polyphenylenevinylene, polyphenylene sulfide.

The conductive ink composition may be contained in dispersion, which is either an aqueous dispersion or an oil based dispersion (e.g. monomer and/or oligomers and or a volatile solvent), may be contained in an emulsion and may include formulation aids.

The formulation aids may comprise at least one of the following: dispersion stabilizers, emulsifiers, binder agents, humectants, buffering agents, antimicrobial agents, chelating, deformer, wetting and rheological additives.

The CCS may be used as an electrode that builds conductive matter during the filling the empty conductive patterns with conductive matter by electroplating.

The method may further comprise the step of rinsing and drying the 3D structure after each electroplating stage.

The 3D structure may be optically examined after each layer is completed.

The conductive ink may comprise irradiation activated additives and is cured by irradiation from a digital micromirror device or from a UV-LED lamps.

The non-conductive ink may comprise irradiation activated additives and is cured by irradiation from a digital micromirror device or from a UV-LED lamps.

The UV inkjet composition may be a free radical UV curable ink.

The electroplating may be performed by exposure to an electrolyte bath configured for electroplating.

The free radical curable ink composition may comprise an adhesion promoter, including:
 monomer acrylates;
 acid modified acrylates;
 oligomer acrylates;
 any combination thereof.

The monomer acrylates may include PHOTOMER 4703 that is obtained from IGM RESINS.

The acid modified acrylates may include EBECRYL® 170 obtained from Allnex.

The oligomer acrylates may include PHOTOMER 4713, obtained from IGM RESINS.

The free radical curable ink composition may include a UV stabilizer or any combination of UV stabilizers.

UV stabilizer may include compounds form the following group:

IRGASTAB® UV 22;
GENORAD™ 16.

One or more additional layers, with a non-conductive portion and an electroplated conductive portion, may be produced upon a previously produced preceding layer with a non-conductive portion and an electroplated conductive portion, wherein electroplated conductive portions of the first and second layers are in co-conduction.

One or more electronic components (such as Resistors, Capacitors, Transistors, Coils, Integrated circuits, Processors, Memory circuits, Logical gates or any combination thereof) may be connected between conductors formed in a layer or in another layer.

A system for producing a 3D structure with conductive material embedded in a non-conductive structure, which comprises:

a. an automated optical inspection unit configured to determine the reliability and quality of any printing cycle by examining the produced layers so as to detect shorts, cuts and/or other defects in the layers;
b. a UV inkjet (dielectric) unit with at least one inkjet printing head and two UV LED lamps;
c. a conductive inkjet unit with at least one inkjet printing head and an infrared ceramic or quartz heating element;
d. at least one plating processing unit with an electrochemical cell containing liquid chemicals and anode, configured to fill empty conductive patterns on the 3D structure with conductive matter by electroplating;
e. an air knife with a heated air blower configured to dry newly produced layers of the 3D structure;
f. a strip & etch unit with a container configured to receive stripped residual matter from the 3D structure; and
g. a table with a conveyor or a linear stage, along which the 3D structure is moved through the units of the system during the various stages of production.

The one of the UV LED lamps may have a 365 nm or 385 nm or 395 nm or 405 nm wave length using for pinning the ink and the other UV LED lamp has a 365 nm or 385 nm or 395 nm or 405 nm wave length using for fully curing the ink.

DETAILED DESCRIPTION OF THE INVENTION

The invention will now be described with reference to specific examples and materials. The following examples are representative of techniques employed by the inventors in carrying out aspects of the present invention. It should be appreciated that while these techniques are exemplary of specific embodiments for the practice of the invention, those of skill in the art, in light of the present disclosure, will recognize that numerous modifications can be made, mutatis mutandis, without departing from the spirit and intended scope of the invention.

Figure 1A:
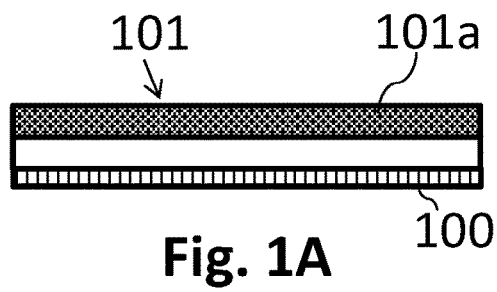
FIGS. 1A-1H schematically illustrate a three dimensional structure with conductive and non-conductive at different stages of production, according to an embodiment of the present invention.
Figure 1B:
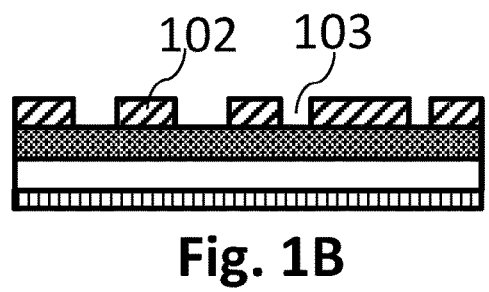

FIGS. 1A-1H schematically illustrate a three dimensional (3D) structure at different stages of production, according to an embodiment of the present invention. In the first stage, shown FIG. 1A, a composite conductive substrate (CCS) 101 is placed on a moving base 100 with its conductive layer 101a facing up. Base 100 is moved to a UV inkjet unit (not shown in FIG. 1), with which a non-conductive layer (NCL) (e.g. 102) is printed upon the CCS using non-conductive UV ink, as shown in FIG. 1B. The conductive template (e.g. 103) that is intended for this layer 105 is left empty, i.e. not printed over by the UV ink.

Figure 1C:
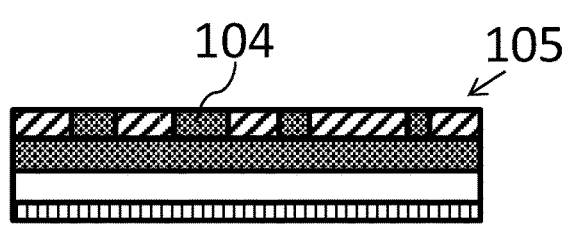

In the next stage base 100 is moved to a plating unit by which an electroplating process is performed and the empty conductive template 103 is coated with conductive matter 104, as shown in FIG. 1C. Because the conductive layer 101a exposed beyond the empty template 103 in NCL 102, it is able to act as an electrode that builds conductive matter during the electroplating of the conductive form (template) in NCL 102. The electroplated conductive layer (ECL) 104 is rinsed for cleaning the traces from the electroplating process, after which an air knife unit is used for drying ECL 104 from water traces. According to an embodiment of the invention, an optical inspection unit examines the produced ECL 104 so as to detect shorts and/or cuts, in which case electroplating and rinsing are repeated. Finally a first layer 105 is achieved.

Figure 1D:
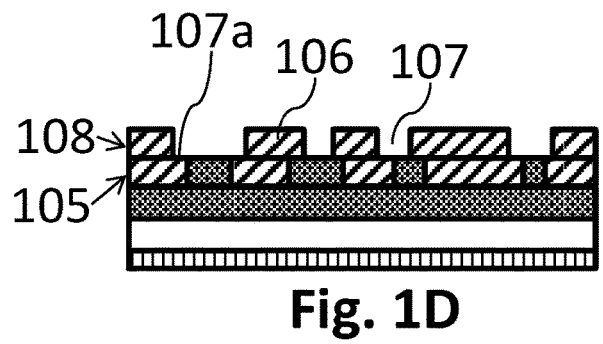

After the layer 105 is completed base 100 is moved once again to a UV inkjet unit for printing an NCL (e.g. 106) of another layer 108 upon the previous layer 105, while leaving the template (e.g. 107) of the new conductive layer empty, as shown in FIG. 1D.

In order to form conductive portions in the new layer 108, an electroplating process is required to produce the next conductive form that was left empty in the new NCL (see FIG. 1D). However, in many circuits and conductive structures (e.g. a Printed Circuit Board—PCB) the conductive portions of adjacent layers are asymmetric, for instance in case one layer comprises a trace. Accordingly, some areas on the conductive template 107 of the new layer 108 are non-conductive, as indicated, for instance, at 107a. Applying an electroplating process to such areas is non-optimal, and would result in low quality conductivity.

Figure 1E:
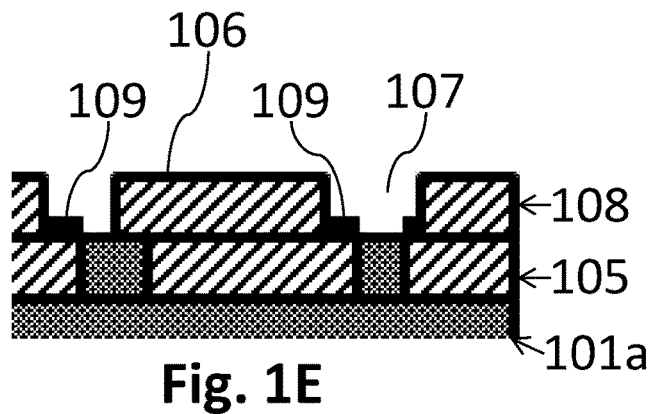

Therefore, according to an embodiment of the present invention, each of the non-conductive areas of layer 105 under template 107 is printed upon with conductive ink. FIG. 1E shows an enlarged view of part of the printed plate with the non-conductive areas of template 107 printed upon with conductive ink. The conductive ink establishes scaffolds 109 upon the non-conductive surfaces that may support the electroplating process for building the next conductive form. In this stage base 100 is moved to a conductive inkjet unit for printing scaffolds 109 upon the non-conductive areas of template. According to an embodiment of the present invention, scaffolds 109 cover the whole template 107, and not only the non-conductive areas thereof, as preformed in other embodiments of the invention. After scaffolds 109 are printed base 100 is moved under an air knife unit for drying the layer from water and/or humectant traces.

According to another embodiment, the conductive ink (which in many cases is water based) may comprise irradiation activated additives that when irradiated, allow curing of the conductive ink layer from the inside, such that when exposed to electroplating process (which is a wet process), will remain solid.

Figure 1F:
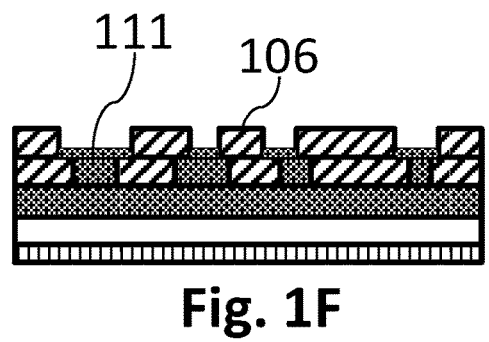

Next, base 100 is moved to a plating unit for filling template 107 with conductive matter. According to an embodiment of the present invention scaffolds 109 are plated electrolessly, i.e. by building copper layer above the conductive ink printed areas (e.g. 107a in FIG. 1E) with copper 111, as shown in FIG. 1F. Existing techniques for electrolessly building copper layers on conductive polymers are describes for example, in "Metal pattern formation by selective electroless metallization on polypyrrole films patterned by photochemical degradation of iron(III) chloride as oxidizing agent" (Ohnishi et al, Synthetic Metals—The Journal of Electronic Polymers and Electronic Molecular Metals, Volume 144, Issue 3, August 2004, Pages 213-316) or in "Electroless plating of palladium and copper on polyaniline films" (Ma et al, Synthetic Metals, Volume 114, Issue 1, July 2000, Pages 17-25).

Figure 1G:
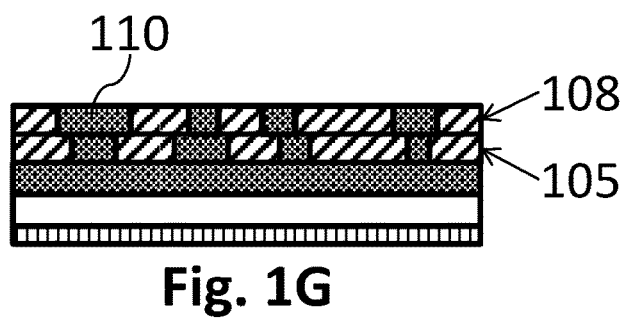
Figure 1H:
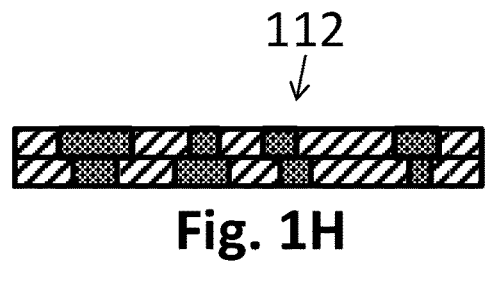

After the conductive ink is coated with conductive matter, base 100 is moved to a strip and etching unit for applying a rinsing process for cleaning the traces from the plating process, after which the base is moved to an air knife unit for drying the layer from water traces. Next an electroplating process is performed in which the template 107 is completed with conductive matter and an ECL 110 is received, as shown in FIG. 1G. According to another embodiment of the invention scaffolds 109 are electroplated with conductive matter.

After ECL 110 is produced base 100 is moved to a strip and etching unit for applying a rinsing process for cleaning the traces from the electroplating process, after which the base is moved to an air knife unit for drying the layer from water traces. According to an embodiment of the invention, an optical inspection unit examines the produced layer 108 and ECL 110 so as to detect shorts and/or cuts, in which case electroplating and rinsing are repeated. Finally the second layer 108 is completed.

The above mentioned stages may be repeated for adding additional layer to the printed plate and receiving precise conductivity between the layers without the need of brutally drilling via holes between the layers.

Once all layers are completed by the process described above, the printed structure is flipped, such that the non-conductive layer of the composite conductive substrate (CCS) 101 is facing up. Then base 100 is moved to a strip and etch unit for stripping the non-conductive layer of the printed plate from CCS 101, based on chemistry degradable polymer. The printed plate remains in the strip and etch unit for a gentle etching process in which the CCS conductive layer is removed from the printed plate, which is then rinsed for cleaning the traces from the etching process. The printed plate is moved under an air knife for drying the bottom side of layer 105 from water traces. The result is a 3D structure 112 with conductivity between the layers thereof.

It is noted that although the 3D structure presented in FIGS. 1A-1H is a printed circuit board (PCB), the present invention is not limited to printing of PCBs and may be used to print any 3D structure that comprises one or more layers with conductive and non-conductive areas and to create conductive paths therebetween.

According to an embodiment of the present invention, CCS 101 comprises a conductive layer and a chemistry degradable non-conductive layer (NCL). The conductive layer may be based on copper, silver, gold, graphene (carbon), or any other conductive material suitable to be removed by a chemical process (e.g., etching). In some embodiments of the invention, the thickness of the conductive layer is between 1 nm and 100 micron, and in other embodiments it is between 5 nm and 5 micron.

The chemistry degradable NCL may unlimitedly comprise Poly lactic acid (PLA), poly vinyl alcohol (PVA), Poly vinyl acetate (PA), or can be a polymeric substrate selected from polyester (polyethylene terephtalate, PET), polypropylene (PP), bi-oriented polypropylene (BOPP), polyethylene (PE), ethylenevinyl acetate (EVA), Nylon, polyamide, polyvinyl chloride (PVC), polyvinyl alcohol (PVA), polystyrene (PS), a bio-degradable polymeric material, polyimide (Kapton), polyether etherketone (PEEK), polycarbonate, polyethylene naphthalate (PEN), polytetrafluoroethylene (Teflon), or a combination thereof.

According to an embodiment of the invention, the conductive ink comprises conductive polymers based on polypyrrole, polyaniline, polythiophene, polyacetylene, polyphenylenevinylene, polyphenylene sulfide, or a combination thereof. In some embodiments of the invention, the conductive particle thickness ranges between 1 nm and 100 micron, and in other embodiments between 5 nm and 5 micron.

Existing techniques for manufacturing conductive polymers are describes for example, in "Nanoparticles of Conjugated Polymers" (Pecher et al, Chemical Reviews, Vol. 110, No. 10 6260-6279, August 2010).

According to another embodiment of the present invention, the conductive polymers are include dispersion, which may be an aqueous dispersion or oil based dispersion (e.g. monomer and/or oligomers and or a volatile solvent) or in an emulsion, and may additionally include formulation aids such as dispersion stabilizers, emulsifiers, binder agents (UV polyurethane dispersion (UV-PUD), for example: UV-PUD, which may include compounds such as, but not limited to: UCECOAT® 2801, UCECOAT® 2802, UCECOAT® 2803 all that may be obtained from Annex®, Germany), humectants, buffering agents, antimicrobial agents, photoinitiators, chelating, deformer, wetting and rheological additives.

According to an embodiment of the present invention, the non-conductive ink from which NCLs are produced comprises UV curable ink composed of chemical components that allow it to polymerize and solidify in response to irradiation, hence cure on a substrate. A typical UV curable ink composition may include a combination of chemical components such as: photoinitiators, monomers, oligomers, colorants, diluents, resins, stabilizers and surfactants. The typical and more common irradiation source for UV-curable inks is UV light source (including UV-LED and digital light processing (DLP) with digital micromirror device (DMD)). However, depending upon the ink ingredients, it may also be cured by irradiation using other energy sources, such as electron beam. The curing process is a chemical reaction in which the activated monomers and oligomers ingredients of the ink polymerize to produce solid ink that is cured on a substrate. The polymerization reaction is initiated by irradiation of the ink that has been applied to a substrate, generally by using a UV light source, leading to photo-activation of the photoinitiators components of the ink mixture. These activated photoinitiators may now activate the monomers and oligomers of the ink composition and as a result a polymerization reaction may proceed. Depending on the ingredients of the ink composition, UV-curable inks exhibit varying degrees of viscosity at room temperature.

Ink Jet printing requires low viscosity inks for jetting, but higher viscosity is essential for controlling drops on the printed surface.

According to another embodiment of the present invention, the non-conductive ink comprises UV-curable ink compositions that are comprised of the following ingredients: photoinitiator (or a combination of photoinitiators) that constitutes between approximately 2% and approximately 10% (weight) of the ink composition; monomer (or a combination of monomers) that constitutes between approximately 68% and approximately 98% (weight) of the ink composition; oligomer (or a combination of oligomers) that constitutes between approximately 0% and approximately 30% (weight) of the ink composition; non curable volatile diluents (or a combination of diluents) that constitutes between approximately 0% and approximately 30% (weight) of the ink composition; colorants (or a combination of colorants) that constitutes between approximately 1% and approximately 10% (weight) of the ink composition; surfactant that constitutes between approximately 0.01% and approximately 4% (weight) of the ink composition; or any combination thereof.

According to yet another embodiment of the present invention, the non-conductive ink composition is a free radical UV curable ink. The free radical ink compositions comprise of the following ingredients: free radical photoinitiator (or a combination of photoinitiators) that constitutes between approximately 2% and approximately 10% (weight) of the ink composition; monomer (or a combination of monomers) that constitutes between approximately 68% and approximately 98% (weight) of the ink composition; oligomer (or a combination of oligomers) that constitutes between approximately 0% and approximately 30% (weight) of the ink composition; colorant (or a combination of colorants) that constitutes between approximately 1% and approximately 10% (weight) of the ink composition; surfactant that constitutes between approximately 0.01% and approximately 4% (weight) of the ink composition.

According to a further embodiment of the present invention, the non-conductive ink composition is a cationic-curable UV ink. The cationic ink compositions comprises the following ingredients: cationic photoinitiator (or a combination of photoinitiators) the constitutes between approximately 1% and approximately 10% (weight) of the ink composition; monomer (or a combination of monomers) that constitutes between approximately 30% and approximately 65% (weight) of the ink composition; oligomers (or combination of oligomers) that constitutes between approximately 0% and approximately 30% of the ink composition; non curable volatile diluent (or a combination of diluents) that constitutes between approximately 0% to about 30% (weight) of the ink composition; colorant (or a combination of colorants) that constitutes between approximately 1% and approximately 10% (weight) of the ink; surfactant that constitutes between approximately 0.01% to 5% (weight) of the ink composition.

According to some embodiments, UV-curable ink compositions are described herein. The ink composition may include photoinitiator (or a combination of photoinitiators), monomer (or a combination of monomers), oligomer (or a combination of oligomers), non-curable volatile diluent (or a combination of diluents), surfactant (or a combination of surfactant), colorant (or a combination of colorants) or any combination thereof. According to some embodiments, the ink composition may be cured by a free radical mechanism, named herein free radical curable ink. According to some embodiments, the free radical curable ink may include free radical photoinitiator. The free radical photoinitiator may include Hydroxyketone, Aminoketones, Mono AcylPhosphine, Bis Acyl Phosphine, Phosphine oxide, Thioxanthones, Polymeric Thioxanthones or any combination thereof. For example: Hydroxyketone containing photoinitiators may include such compounds as, but not limited to: IRGACURE® 184, IRGACURE® 500, DAROCUR® 1173, IRGACURE® 2959, all may be obtained from BASF Ciba Specialty Chemicals (former Ciba Specialty Chemicals). Aminoketones containing photoinitiators may include such compounds as, but not limited to: IRGACURE® 369, IRGACURE® 907, IRGACURE® 1300 all may be obtained from BASF (former Ciba Specialty Chemicals). Mono Acyl phosphine and/or Bis Acyl Phosphine containing photoinitiators may include such compounds such as, but not limited to: DAROCUR® TPO, DAROCUR® 4265, IRGACURE® 819, IRGACURE® 819DW, IRGACURE® 2022 all may be obtained from BASF (former Ciba Specialty Chemicals). Thioxanthones containing photoinitiators may include such compounds such as, but not limited to: SPEEDCURE™ 2-ITX, SPEEDCURE™ CPTX, SPEEDCURE™ re DETX all may be obtained from LAMBSON. Polymeric Thioxanthones containing photoinitiators may include such compounds such as, but not limited to: SPEEDCURE™ PTX-800, SPEEDCURE™ 7010, SPEEDCURE™ 7010-L all may be obtained from LAMBSON. However, it should be clear to one of skill in the art that any applicable photoinitiator either known today or to be developed in the future, may be applicable to the present invention and is contemplated.

According to some embodiments of the present invention, a free radical curable ink composition may include a monomer (or any combination of monomers). The monomer (or a combination of monomers) may include monofunctional acrylates, difunctional acrylates, trifunctional acrylates, highly functional acrylates, monofunctionalmethacrylates, difunctionalmethacrylates, trifunctional methacrylates, non-acrylic monomers, or any combination thereof. For example: Monofunctional acrylate monomers may include such compounds as, but not limited to: CD217, SR256, SR257C, CD278, SR285, SR335, SR339C, SR395, SR410, SR420, SR440, SR484, SR489, SR495B, SR504, SR506D, SR531, CD586D, SR789, all may be obtained from Sartomer Co (today part of Arkema group). Difunctional acrylate monomers may include such compounds as, but not limited to: SR238, SR259, SR268US, SR272, SR306, SR341, SR344, SR349, SR601E, SR602, SR4423, SR508, CD536, CD595, SR606A, SR610, SR802, SR833S, SR9003, all may be obtained from Sartomer Co (today part of Arkema group). Trifunctional acrylate and/or highly functional acrylates monomers may include such compounds as, but not limited to: SR295, SR351, SR355, SR368, SR399, SR399LV, SR444D, SR454, SR499, SR502, SR9035, SR415, SR492, SR494, SR9020, CD9021, all may be obtained from Sartomer Co (today part of Arkema group). Monofunctional methacrylates, difunctional methacrylates, trifunctional methacrylates monomers may include such compounds as, but not limited to: SR203, SR313A, SR313E, SR340, SR421A, SR423D, SR550, SR604, SR101K, SR348L, SR348C, SR150, SR540, SR480, SR205, SR206, SR209, SR210, SR214, SR231, SR239A, SR252, CD262, SR297J, SR603OP, SR834, SR350, all may be obtained from Sartomer Co (today part of Arkema group). However, it should be clear to one of skill in the art that any applicable monomer either known today or to be developed in the future, may be applicable to the present invention and is contemplated.

According to some further embodiments of the present invention, a free radical curable ink composition may include an oligomer (or any combination of oligomers) that may include epoxy acrylates, aliphatic urethane acrylates, aromatic urethane acrylates, methacrylates and polyester acrylates with low viscosity or any combination thereof. For example: epoxy acrylates may include such compounds as, but not limited to: CN109, CN129, CN131B, CN132, CN133, CN152, CNUVE130, CNUVE150/80, may be obtained from Sartomer Co (today part of Arkema group), EBECRYL® 113, EBECRYL® 3300, EBECRYL® 3416, may be obtained from Allnex. Aliphatic urethane acrylates may include such compounds as, but not limited to: CN9245, CN 9251, CN922, CN925, CN9276, CN991, may be obtained from Sartomer Co (today part of Arkema group), EBECRYL® 225, EBECRYL® 4858, EBECRYL® 8210, EBECRYL® 8402 may be obtained from Allnex. Aromatic urethane acrylates may include such compounds as, but not limited to: CN9165, CN 9167, CN9196, CN992, may be obtained from Sartomer Co (today part of Arkema group). Polyester acrylates may include such compounds as, but not limited to: CN203, CN204, CN2505, CN293, SYNO-CURE™ AC1007, may be obtained from Sartomer Co (today part of Arkema group). Methacrylates may include such compounds as, but not limited to: CN159, may be obtained from Sartomer Co (today part of Arkema group). However, it should be clear to one of skill in the art that any applicable oligomer either known today or to be developed in the future, may be applicable to the present invention and is contemplated.

According to some further embodiments of the present invention, the free radical curable ink composition may include an adhesion promoter (or any combination of adhesion promoter) that may include monomer acrylates, acid modified acrylates, oligomer acrylates, or any combination thereof. For example: monomer acrylates may include such compounds as, but not limited to: PHOTOMER® 4703, may be obtained from IGM RESINS. Acid modified acrylates may include such compounds as, but not limited to: EBECRYL® 170, may be obtained from Allnex. Oligomer acrylates may include such compounds as, but not limited to: PHOTOMER® 4713, may be obtained from IGM RESINS. However, it should be clear to one of skill in the art that any applicable oligomer either known today or to be developed in the future, may be applicable to the present invention and is contemplated.

According to some further embodiments of the present invention, the free radical curable ink composition may include a UV stabilizer (or any combination of UV stabilizers). For example, the UV stabilizer may include such compounds as, but not limited to: IRGASTAB® UV 22 (BASF Corporation (Ludwigshafen, Germany), GENORAD® 16 may be obtained from Rahn USA Corporation (Aurora, Ill., U.S.A.). However, it should be clear to anyone skilled in the art that any applicable UV stabilizer either known today or to be developed in the future, may be applicable to the present invention and is contemplated.

According to some embodiments, the free radical curable ink includes a colorant. The colorant may include pigment, dye or any combination thereof. The colorants may be transparent, unicolor or composed of any combination of available colors.

According to some embodiments of the present invention, the free radical curable ink composition may include surfactant (or a combination of surfactants). For example, surfactant may include such compounds as, but not limited to: BYK-361N, BYK-378, BYK-1791, BYK-1794, BYK-1798, BYK-3441, BYK-3455, BYKJ ET-9150, BYKJ ET-9151, BYKJ ET-9152, BYK-UV 3500, BYK-UV 3505, BYK-UV 3530, BYK-UV 3575, obtained from BYK-Chemie (a member of ALTANA), TegoRad 2100, TegoRad 2200N, TegoRad 2250, TegoRad 2300, TegoRad 2500, TegoRad 2700, TegoAirex 920, TegoVariPlus 3350 UV, TegoVariPlus SK, obtained from Evonik industries (former Degussa AG) or any combination thereof. However, it should be clear to one of skill in the art that any applicable surfactant either known today or to be developed in the future, may be applicable to the present invention and is contemplated.

According to some embodiments, the UV-curable ink composition may exhibit a viscosity value of about 5 to about 50 centiPoise (cP) at room temperature or about 5 to about 20 cP at working temperature. The working temperature may be between approximately 20° C. and about 80° C.

According to an embodiment of the present invention, the plating process is based on methods for electroplating articles with metal coatings that generally involve passing a current between two electrodes in a plating solution where one of the electrodes is the article to be plated. A typical acid copper plating solution comprises dissolved copper (usually copper sulfate but not limited to), an acid electrolyte such as sulfuric acid in an amount sufficient to impart conductivity to the bath, and proprietary additives to improve the uniformity of the plating and the quality of the metal deposit. Such additives include brighteners, levelers, surfactants, suppressants, etc.

According to an embodiment of the present invention, the plating process is performed by: In situ direct current (DC) plating, In situ pulse plating, In situ periodic pulse reverse plating (PPR), vertical plating, horizontal plating, or a combination thereof.

Figure 2:
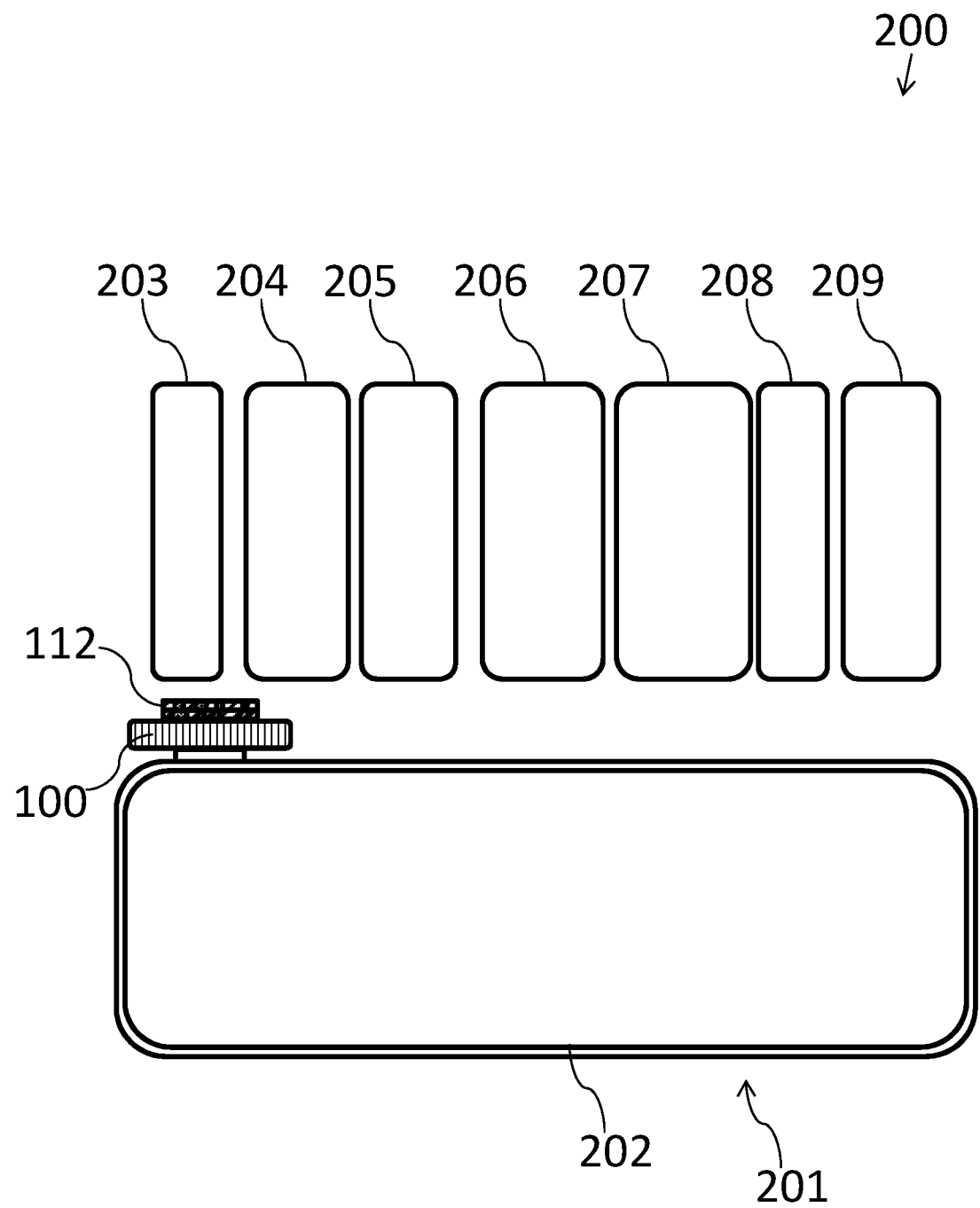
FIG. 2 schematically illustrates a system for producing a 3D structure with conductive material embedded in a non-conductive structure, according to an embodiment of the present invention.

FIG. 2 schematically illustrates a system 200 for producing a 3D structure with conductive material embedded in a non-conductive structure, according to an embodiment of the present invention. System 200 comprises a table 201 with a conveyor 202 (or a linear stage) along which base 100 is moved through the various stages of production. 3D structure 112 is printed on base 100.

An automated optical inspection unit 203 is provided for determining the reliability and quality of any printing cycle by examining the produced layers so as to detect shorts, cuts and/or other defects in the layers.

A UV inkjet (dielectric) unit 204 is provided containing at least one inkjet printing head and two UV LED lamps. A dielectric layer is built on the top of the plate using an Inkjet printing head, after which the base 100 is moved under the UV LED lamps for the polymerization of the UV ink layer. According to an embodiment of the present invention, the first lamp has a 365 nm or 385 nm or 395 nm or 405 nm wave length using for pinning the ink and the second lamp has a 365 nm or 385 nm or 395 nm or 405 nm wave length using for fully curing the ink.

A conductive inkjet unit 205 is provided, containing at least one inkjet printing head and an infrared ceramic heating element. A water base conductive ink is printed on areas required to be conductive, after which the base 100 is moved under an infrared ceramic heating element or infrared quartz heating element for a period of time, which depends on the amount of ink used.

A first plating processing unit 206 is provided, which uses an electrochemical cell containing liquid chemicals and anode suitable for building copper above the conductive ink printed areas, with copper or other conductive matter, as shown in conjunction with FIG. 1F. A second plating processing unit 207 is provided, which uses another electrochemical cell containing liquid chemicals and anode, suitable for filling the empty conductive pattern with conductive matter by electroplating. In some embodiments of the present invention, plating processing unit 206 is omitted, and only plating processing unit 207 is used for electroplating.

An air knife unit 208 is provided, which uses a heated air blower for drying newly produced layers of 3D structure 112. A strip & etch unit 209 is provided, with a container that is filled when needed with rinsed, stripped and etched residual matter, and used for removing the support substrate (CCS) in the end.

According to one embodiment, one or more additional layers, with a non-conductive portion and an electroplated conductive portion are produced upon a previously produced preceding layer with a non-conductive portion and an electroplated conductive portion, wherein electroplated conductive portions of the first and second layers are in co-conduction. One or more electronic components (such as Resistors, Capacitors, transistors, Coils, Integrated circuits, Processors, Memory circuits, Logical gates etc.) may be connected between conductors formed in a layer or in another layer, to form a complete electronic circuit.

Although embodiments of the invention have been described by way of illustration, it will be understood that the invention may be carried out with many variations, modifications, and adaptations, without exceeding the scope of the claims.

The invention claimed is:

1. A method for producing a three dimensional (3D) structure, comprising:
    a) providing a composite conductive substrate (CCS) with a conductive layer and a non-conductive layer;
    b) determining a conductive pattern for each layer of the 3D structure;
    c) printing a first layer of non-conductive matter on said CCS, such that the conductive pattern of the first layer left empty from said non-conductive matter;
    d) filling the empty conductive pattern with conductive matter by electroplating; and
    e) for each following layer, in turn:
        i) printing, on the previous layer, a layer of non-conductive matter, the conductive pattern of the present layer left empty from said non-conductive matter;
        ii) plating non-conductive areas of the previous layer that are left uncoated with conductive matter; and
        iii) filling the empty conductive pattern of the present layer with conductive matter by electroplating.

2. The method for producing a 3D structure according to claim 1, wherein the non-conductive matter is formed using a UV-curable ink composition.

3. The method for producing a 3D structure according to claim 1, wherein non-conductive areas of a previous layer that are left uncoated are coated with a conductive layer, which is printed using conductive ink.

4. The method for producing a 3D structure according to claim 3, wherein the conductive ink comprises conductive polymers based on one of the following materials, or on a combination thereof: polypyrrole, polyaniline, polythiophene, polyacetylene, polyphenylenevinylene, polyphenylene sulfide.

5. The method for producing a 3D structure according to claim 3, wherein the conductive ink composition is contained in an emulsion or includes formulation aids.

6. The method for producing a 3D structure according to claim 5, wherein the formulation aids comprise at least one of the following: dispersion stabilizers, emulsifiers, binder agents, humectants, buffering agents, antimicrobial agents, chelating, deformer, wetting and rheological additives.

7. The method for producing a 3D structure according to claim 1, wherein the CCS is used as an electrode that builds conductive matter during the filling the empty conductive patterns with conductive matter by electroplating.

8. The method for producing a 3D structure according to claim 2, wherein the non-conductive ink comprises irradiation activated additives and is cured by irradiation from a digital micromirror device or from a UV-LED lamps.

9. The method for producing a 3D structure according to claim 1, wherein the electroplating is performed by exposure to an electrolyte bath configured for electroplating.

10. The method for producing a 3D structure according to claim 2, wherein the UV-curable ink composition is a free radical UV-curable ink composition, which comprises an adhesion promoter, including:
    monomer acrylates;
    acid modified acrylates; oligomer acrylates; and
    any combination thereof.

11. The method for producing a 3D structure according to claim 10, wherein the monomer acrylates include a UV/Electron beam (EB) curable monacrylate.

12. The method for producing a 3D structure according to claim 10, wherein the acid modified acrylates include an acidic acrylate adhesion promoter.

13. The method for producing a 3D structure according to claim 10, wherein the oligomer acrylates may include a UV/Electron beam (EB) curable oligomer.

14. The method for producing a 3D structure according to claim 10, wherein the free radical curable ink composition includes a UV stabilizer or any combination of UV stabilizers.

15. The method for producing a 3D structure according to claim 14, wherein the UV stabilizer includes compounds from the following groups:
    an acrylate monomer stabilizer;
    a glycerol propoxylate (1PO/OH) triacrylate.

16. The method for producing a 3D structure according to claim 1, further comprising producing one or more additional layers, with a non-conductive portion and an electroplated conductive portion upon a previously produced preceding layer with a non-conductive portion and an electroplated conductive portion, wherein electroplated conductive portions of the first and second layers are in co-conduction.

17. The method for producing a 3D structure according to claim 1, further comprising connecting one or more electronic components between conductors formed in a layer or in another layer, wherein said one or more electronic components are selected from the group of: Resistors; Capacitors; Transistors; Coils; Integrated circuits; Processors; Memory circuits; and Logical gates.

18. The method for producing a 3D structure according to claim 8, wherein the digital micromirror device receives light from a LED light source with 365 nm or 385 nm or 395 nm or 405 nm wavelength.

19. A system for producing a 3D structure with conductive material embedded in a non-conductive structure, comprising:
    a) an automated optical inspection unit configured to determine the reliability and quality of any printing cycle by examining the produced layers so as to detect shorts, cuts and/or other defects in the layers;
    b) a UV inkjet (dielectric) unit with at least one inkjet printing head and two UV LED lamps;

c) a conductive inkjet unit with at least one inkjet printing head and an infrared ceramic or quartz heating element;
d) at least one plating processing unit with an electrochemical cell containing liquid chemicals and anode, configured to fill empty conductive patterns on the 3D structure with conductive matter by electroplating;
e) an air knife with a heated air blower configured to dry newly produced layers of the 3D structure;
f) a strip & etch unit with a container configured to receive stripped residual matter from the 3D structure; and
g) a table with a conveyor or a linear stage, along which the 3D structure is moved through the units of the system during the various stages of production.

20. The system according to claim 19, in which the one of the UV LED lamps has a 365 nm or 385 nm or 395 nm or 405 nm wave length using for pinning the ink and the other UV LED lamp has a 365 nm or 385 nm or 395 nm or 405 nm wave length using for fully curing the ink.

* * * * *